United States Patent [19]

Einziger

[11] Patent Number: 5,863,861
[45] Date of Patent: Jan. 26, 1999

[54] STABLE AQUEOUS FERTILIZER COMPOSITION CONCENTRATE COMPRISING POTASSIUM

[75] Inventor: Mark David Einziger, Manalapan, N.J.

[73] Assignee: Rhodia Inc., Cranbury, N.J.

[21] Appl. No.: 747,484

[22] Filed: Nov. 12, 1996

[51] Int. Cl.$^6$ ............ A01N 25/02; C05G 3/02; C05G 3/06
[52] U.S. Cl. ............ 504/116; 71/64.08
[58] Field of Search ............ 504/116; 71/64.08

[56] References Cited

U.S. PATENT DOCUMENTS

| | | | |
|---|---|---|---|
| 3,096,170 | 7/1963 | Newsom | 71/64 |
| 3,109,729 | 11/1963 | Slack et al. | 71/42 |
| 3,234,005 | 2/1966 | Smalter et al. | 71/29 |
| 3,519,413 | 7/1970 | Trimbach et al. | 71/42 |
| 3,829,412 | 8/1974 | Kunz | 260/209 R |
| 3,950,159 | 4/1976 | Fox et al. | 71/11 |
| 5,164,179 | 11/1992 | Hioki et al. | 424/78.08 |
| 5,341,932 | 8/1994 | Chen et al. | 206/524.7 |
| 5,550,224 | 8/1996 | Hazen | 536/114 |

FOREIGN PATENT DOCUMENTS 0 485 225 A1  7/1991  European Pat. Off. .......... C05D 9/02

OTHER PUBLICATIONS

Farm Chemicals, Nov. 1994, pp. 26–28.

*Primary Examiner*—S. Mark Clardy
*Attorney, Agent, or Firm*—John A. Shedden

[57] ABSTRACT

Aqueous fertilizer composition concentrates comprising potassium and optionally azote, phosphorous and sulfur are stabilized with a mixture of guar and xanthan gum; present a high content in nutrients; and can be used in drip irrigation systems without clogging.

19 Claims, No Drawings

STABLE AQUEOUS FERTILIZER COMPOSITION CONCENTRATE COMPRISING POTASSIUM

BACKGROUND OF THE INVENTION

1. Field of the Invention

This invention relates to a stable aqueous fertilizer composition concentrate comprising potassium and a mixture of guar gum and xanthan gum as a stabilizing agent.

2. Technology Description

It is known that aqueous fertilizer compositions in a fluid form present several advantages compared with fertilizer composition in a solid form.

The preparation of such liquid aqueous compositions avoids granulating and drying steps and obviates other drawbacks such as caking or dust formation.

These aqueous fertilizer compositions are currently made in a liquid form as solution and/or as suspension fertilizers. In solution, the fertilizers are dissolved in water and, in suspension, the fertilizers are still present as a solid phase and have to remain as a stable suspension in water.

However, a serious disadvantage of liquid fertilizer resides in the limited solubility of most of the various salts comprising the nutrients themselves, thereby making it difficult to obtain product concentrates.

Attempts have been made to prepare aqueous suspensions having a nutrient content higher than that of solutions. However, the storage stability is insufficient, and to obtain fertilizer suspensions that are stable during storage, it is known to add to these suspensions various suspending agents. These suspending agents can be swelling clays such as bentonite and attapulgite as described in U.S. Pat. Nos. 3,109,729 and 3,096,170 or starches, gums and carboxymethyl cellulose as described in U.S. Pat. No. 3,234,005.

These most promising suspending agent improvements, however, have proven to be insufficient for aqueous fertilizer compositions comprising potassium.

Potassium is an essential nutrient used on many crops in fairly large amounts. As a nutrient for fluid formulations, potassium is difficult to manage due to its high bulk density. Useful potassium compounds have a tendency to settle or to salt out of solution. This is particularly true for potassium sulfate or sulfate of potash, which is a preferred potassium and sulfur source for chloride and salt sensitive crops.

Moreover, the suspensions of the prior art when used in drip irrigation systems, clog the apertures or holes of the lines or hoses because of the presence of clay suspending agent.

A principal object of this invention is to provide an aqueous fertilizer composition concentrate comprising potassium, i) which is stable upon storage for several months; ii) that can be shipped without settling; iii) that has a high content of nutrients; and iv) that can be more particularly used in drip irrigation systems without clogging the apertures or holes of the lines or hoses.

SUMMARY OF THE INVENTION

To attain these objectives and others, it has now been serendipitously discovered that an aqueous fertilizer composition concentrate comprising potassium and a mixture of guar and xanthan gum has essentially none of the above identified disadvantages associated with known aqueous fertilizer compositions and can be used, after appropriate dilution with water, in drip irrigation without clogging the apertures or holes of the lines or hoses.

DETAILED DESCRIPTION OF THE INVENTION

The invention more particularly relates to a stable aqueous fertilizer composition concentrate comprising potassium and about 0.10 to 0.60, preferably about 0.20 to 0.40 weight percent of a suspending agent mixture of hydrocolloids comprising about 90 to 50, preferably about 80 to 60 weight percent of xanthan gum and 10 to 50, preferably about 20 to 40 weight percent of guar gum.

The weight percent of the mixture of hydrocolloids is based on the total weight of the fertilizer composition concentrate and the weight percent of xanthan gum and guar gum is based on the total weight of hydrocolloids.

Xanthan gum is a polysaccharide derived from microorganisms of the genus xanthomonas, preferably from xanthomonas campestris.

Guar gum, classified as a galactomannan, is a nonionic polysaccharide derived from the seed of the guar plant, cyamopsis tetragonolobus, family leguminosae.

All of the commercially available gums are usable in the invention. However, Rhodopol 23® xanthan gum and Higum MV2/6® guar gum, both of them commercialized by Rhône-Poulenc Inc., a Corporation of New Jersey, are preferred.

Other products can be added in the fertilizer composition concentrate, for example, pesticides, herbicides and micronutrients such as preferably water soluble compounds of zinc, iron, cobalt, molybdenum, copper, boron, magnesium, manganese and mixtures thereof.

Typical grades of fertilizer compositions used by the skilled artisan are indicated herein below by the conventional three number designation respectively indicating the percentage by weight of nitrogen as N, phosphorus as $P_2O_5$ and potassium as $K_2O$ in the composition.

Typical grades include compositions designated as 2-6-32-, 0-0-40, 0-0-36, 14-28-7, 12-18-18, 10-20-20, 9-18-27 and 3-10-30.

Among the nitrogen compounds, the more usually employed are ammonium nitrate, ammonium sulfate, ammonium phosphates, potassium nitrate and urea. Among the phosphorus compounds, the more usually employed are ammonium phosphates, potassium phosphates and calcium phosphates. Among the potassium compounds, the more usually employed are potassium chloride, potassium nitrate, potassium phosphates, muriate of potash and potassium sulfate or sulfate of potash.

In fertilizer compositions which further comprise sulfur, the grade of sulfur is indicated by a fourth number followed by the letter S and standing for the percentage by weight of sulfur as S.

Typical grades include compositions designated as 0-0-24-8S, 0-0-36-12S, 3-10-30-10S, 20-0-10-3S, and 13-0-13-3S.

The amount of water which may be present in the fertilizer composition concentrate will depend on the nature of the fertilizer or mixture of fertilizers in the composition. Preferably, the amount of water present in the composition of this invention is the minimum quantity required to provide a stable suspension which is capable of being handled as a liquid.

Typically, most of the time, the quantity of water in the fertilizer composition concentrate is from about 10 to 90 weight percent more particularly from about 20 to 80% of the total composition.

Just before its use, the concentrate is diluted with water, most of the time between about 5 to 20, more particularly between 8 to 16 times its own volume of water.

The fertilizer composition concentrates of this invention and more particularly those with higher grades of $K_2O$ and S, have the advantage of transforming into clear solutions for fertigation use through drip irrigation systems upon dilution with water as indicated above. They also have the advantage of being blendable with other fertilizer compositions and with pesticides and herbicides. It would be noticed that some pesticides are rendered ineffective when mixed with clay such as paraquat and glyphosate, but will remain effective with the specific mixture of hydrocolloids according to this invention.

The fertilizer composition concentrates of this invention may be spread or sprayed conveniently through conventional devices from an airplane or at ground level. At ground level, all types of irrigation systems may be used including furrow, sprinkler, linear and center pivot.

Furthermore, as already set forth before, the fertilizer composition concentrates of this invention are more particularly suitable in drip irrigation systems where the compositions are delivered, most of the time, only by gravity, drop by drop onto the field. Such drip irrigation systems are barely usable with fertilizers suspended by clay because the clay clogs the apertures of the lines of the irrigation systems through which the fertilizer composition drips (flows drop by drop).

When the apertures or holes are clogged, it is necessary to wash out the lines with an acid solution which is time-consuming and expensive. The drip irrigation fertilizer clay suspension system cannot be run simultaneously with an acid solution (generally phosphoric acid) because clay settles faster in acid medium, the acid breaking the clay suspension. Thus, the end user usually runs in a first step, all nutrients except phosphorus in a clay suspension system, then, in a second step, runs phosphoric acid through the lines to clean the lines; and then runs a stronger mineral acid such as HCl through the lines to ensure that all lines and apertures and clear; and the steps are repeated. The composition of this invention can have a pH as low as 2.5 and can be run through the lines with phosphoric acid without clogging. Therefore, the compositions of this invention are self-cleaning.

This invention also relates to a process for spreading a fertilizer composition with a drip irrigation system, comprising the steps of:

diluting with water an aqueous fertilizer composition concentrate as herein described and more particularly an aqueous composition concentrate comprising potassium and about 0.10 to 0.60, preferably about 0.20 to 0.40 weight percent, based on the total weight of the fertilizer composition, of a mixture of hydrocolloids comprising about 90–50 weight percent, preferably about 80–60 weight percent of xanthan gum and about 10–50 weight percent, preferably about 20–40 weight percent of guar gum based on the total weight of the hydrocolloids; the pH of said concentrate being greater than about 2.5, the viscosity of this concentrate being between about 200 to about 1000 cps; and introducing the diluted composition into a drip irrigation system.

The fertilizer composition may be prepared according to the following process. A reacting vessel having central agitation is used. The vessel is fed through the top with the different nutrient ingredients and the mixture of hydrocolloids and water is fed through the bottom through a pump which can also empty the vessel when the preparation of the fertilizer concentrate is completed.

In a first step, the hydrocolloids are mixed with water and the resulting mixture is agitated. At the time of hydrocolloids addition, the water should be vigorously agitated in a liquid mixing unit with both a pump and an agitator in operation. Variations in water quality, temperature, or mineral content have not been shown to have any effect on the fertilizer concentrate preparation. However, maximum hydrocolloids hydration is important and will occur when water pH is slightly above about 7.

It is preferable to add a small amount of an acid to lower the water pH and enhance the hydration process of the hydrocolloids. This will reduce mixing time, lower the amount of hydrocolloids required and prevent excessive unhydrated hydrocolloids.

Obtaining the desired viscosity of the water and hydrocolloid mixture prior to the addition of potassium is important for the quality of the final fertilizer composition concentrate. It is recommended to reach a viscosity of about 200 centipoise before adding potassium. At this point, the mixture has a thin jelly-like consistency. This viscosity and all the viscosity values herein set forth are measured by using a Brookfield dial viscometer model RVT with spindle No. 4 rotated at 100 rpm.

When the right viscosity is obtained, the potassium compound, preferably potassium sulfate or sulfate of potash, is added quickly and enough agitation is used to adequately mix the potassium sulfate with the pre-gel mixture. Continued agitation with the agitator and recirculation pump, following nutrient addition are necessary to obtain the desired final viscosity.

Final viscosity of the fertilizer composition concentrate will vary depending on what nutrient composition and nutrient sources are used. The skilled artisan will have no difficulties determining the right viscosity to assure optimum stability for both static storage and transportation. It is recommended according to this invention that the viscosity of the concentrate be between 200 and 1,000 cps, this viscosity being usually higher when the content of potassium is higher. This viscosity will reach a maximum value of about 800–1,000 cps with a maximum content of $K_2O$ in the concentrate of about 40 weight percent.

EXAMPLES I–II:

By following the general process described above 0-0-24-8S, and 0-0-36-12S fertilizer compositions are made.

The starting compositions are:

a mixture of hydrocolloids;

a mixture of 30 weight percent. Higum MV 2/6® guar gum commercialized by Rhône-Poulenc Inc. and 70 weight percent of Rhodopol 23®, xanthan gum commercialized by Rhône-Poulenc Inc.

sulfate of potash commercialized by Great Salt Lake Minerals Corporation.

The percentage of the different components of the fertilizer compositions and the final viscosity of the concentrates are set forth in Table I herein below.

TABLE I

Raw Materials (weight percent)

| Fertilizer Composition | Water | Hydrocolloid | Sulfate of Potash | Viscosity |
|---|---|---|---|---|
| 0-0-36-12S | 31.35 | 0.15 | 68.50 | 750–900 |
| 0-0-24-8S | 54.05 | 0.25 | 45.70 | 350–450 |

EXAMPLE III

Preparation of a 20-0-10-3S Fertilizer Composition

The general process herein above described is carried out again except that water is first combined with ammonium nitrate (30-0-0) and then 0.25 weight percent of hydrocolloids (30 weight percent guar+70 weight percent xanthan) is added. Thereafter, 0.075 weight percent acid in the form of HCl or $H_2SO_4$ is added. A viscosity of about 200 cps is then obtained with agitation; potassium sulfate is added; and a final viscosity of 480 cps is reached following the final agitation phase.

Magnesium oxide is added together with 1 weight percent of polyvinylic alcohol sold by Rhône-Poulenc under the trade mark Soprophor FLK®. The percentage of the different components are set forth in Table II herein below:

TABLE II

Composition 20-0-10-3S

| Ingredient | Percent by Weight | Addition order |
|---|---|---|
| Ammonium Nitrate (30-0-0) | 66.67 | 1 |
| Water | 13.79 | 2 |
| Hydrocolloids | 0.25 | 3 |
| Acid (HCl concentrate) | 0.06 | 4 |
| Sulfate of Potash | 19.23 | 5 |
| Viscosity (cps) | 480 | |

EXAMPLE IV

Preparation of a 3-10-30-10S Fertilizer Composition

The general process herein above described is carried out again except that water is first combined with ammonium nitrate (28-0-0) and then 0.23 weight percent of hydrocolloids (30 weight percent guar+70 weight percent xanthan) is slowly added. When the addition of ammonium nitrate is completed, ammonium phosphate is added with continuous mixing until the material is completely blended. Thereafter, potassium sulfate is added while mixing and is blended for 5 to 10 minutes, the final viscosity will be about 300 cps.

The percentage of the different components are set forth in Table III herein below:

TABLE III

Composition 3-10-30-10S

| Ingredient | Percent by Weight | Addition order |
|---|---|---|
| Water | 12.02 | 1 |
| Ammonium nitrate 28-0-0 | 10.00 | 2 |
| Hydrocolloids | 0.23 | 3 |
| Diammonium phosphate | 21.65 | 4 |
| Potassium Sulfate | 56.10 | 5 |
| Viscosity (cps) | 300 | |

The fertilizer composition concentrates of this invention will flow and pump much better than clay-based suspensions. They will store longer, i.e. for several months, even a year or more without settling, which permits flat bottom field tank storage without agitation. Although a clear layer may form on the surface, the underlying mixture remains homogeneous and re-mixes easily with pump recirculation or minimal agitation. A 10 ton clay-based suspension of the prior art contains up to 600 pounds of insoluble clay whereas the same amount of the composition of this invention contains only about 30 pounds of hydrocolloids. Thus much more active material is available to the end user per field delivered unit.

The fertilizer compositions of this invention, unlike their clay-based counterparts, are compatible with pesticides that lose their effectiveness when mixed with clay. Furthermore, the instant compositions can be used in drip irrigation systems without clogging the lines.

I claim:

1. An aqueous clay-free fertilizer composition concentrate, having a pH greater than about 2.5, comprising potassium compound and about 0.10–0.60, weight percent based on the total weight of the fertilizer composition of a mixture of hydrocolloids comprising about 90–50 weight percent of xanthan gum and about 10–50 weight percent of guar gum based on the total weight of hydrocolloids said concentrate having a viscosity of about 200 to 1,000 cps.

2. An aqueous fertilizer composition concentrate according to claim 1, comprising about 0.20 to 0.4 weight percent of the said mixture of hydrocolloids.

3. An aqueous fertilizer composition concentrate according to claim 1, comprising about 80–50 weight percent of xanthan gum and about 20–40 weight percent of guar gum.

4. An aqueous fertilizer composition concentrate according to claim 1, further comprising azote.

5. An aqueous fertilizer composition concentrate according to claim 1, further comprising a phosphorus compound.

6. An aqueous fertilizer composition concentrate according to claim 1, further comprising a sulfur compound.

7. An aqueous fertilizer composition concentrate according to claim 1, further comprising micronutrients selected from the group consisting of zinc, iron, cobalt, molybdenum, copper, boron, magnesium, manganese and mixtures thereof.

8. An aqueous fertilizer composition concentrate according to claim 1, further comprising pesticides or herbicides.

9. An aqueous fertilizer composition concentrate according to claim 8, wherein the pesticide is paraquat or glyphosate.

10. A process of spreading a clay-free fertilizer composition with a drip irrigation system, comprising the steps of:

diluting with water an aqueous fertilizer composition concentrate comprising a potassium compound and about 0.10 to 0.60, weight percent, based on the total weight of the fertilizer composition, of a mixture of hydrocolloids comprising about 90–50 weight percent, of xanthan gum and about 10–50 weight percent of guar gum based on the total weight of the hydrocolloids, the pH of said concentrate being greater than about 2.5, the viscosity of this concentrate being between about 200 to about 1000 cps; and introducing the diluted composition into a drip irrigation system.

11. A process according to claim 10, wherein said concentrate comprises about 0.20 to 0,4 weight percent of the said mixture of hydrocolloids.

12. A process according to claim 10, wherein said concentrate comprises about 80–50 weight percent of xanthan gum and about 20–40 weight percent of guar gum.

13. A process according to claim 10, wherein said concentrate further comprises azote.

14. A process according to claim 10, wherein said concentrate further comprises a phosphorus compound.

15. A process according to claim 10, wherein said concentrate further comprises a sulfur compound.

16. A process according to claim 10, wherein said concentrate further comprises micronutrients selected from the group consisting of zinc, iron, cobalt, molybdenum, copper, boron, magnesium, manganese and mixtures thereof.

17. A process according to claim 10, wherein said concentrate further comprises pesticides or herbicides.

18. A process according to claim 17, wherein said pesticide is paraquat or glyphosate.

19. A process according to claim 10, wherein said concentrate is diluted with a volume of water corresponding to about 5 to 20 times the volume of the concentrate.

* * * * *